US005181756A

United States Patent [19]

Yurick

[11] Patent Number: 5,181,756

[45] Date of Patent: Jan. 26, 1993

[54] HOISTING CAGE WITH INTERIOR TRUSS DESIGN

[76] Inventor: Michael R. Yurick, 995 Ladd Rd., Walled Lake, Mich. 48088

[21] Appl. No.: 709,111

[22] Filed: Jun. 3, 1991

[51] Int. Cl.[5] ........ B62D 6/34

[52] U.S. Cl. ........ 294/68.1; 294/67.1

[58] Field of Search ........ 294/68.1, 67.1, 68.2, 294/68.21, 68.3

[56] References Cited

U.S. PATENT DOCUMENTS

| | | | |
|---|---|---|---|
| 1,637,960 | 8/1927 | Romine | 294/68.1 |
| 2,056,178 | 10/1936 | Fitch | 294/68.1 X |
| 2,541,261 | 2/1951 | Martinson | 294/68.1 |
| 2,559,703 | 7/1951 | Bergman | 294/67.1 X |
| 2,717,801 | 9/1955 | Neil | 294/67.1 X |
| 2,761,724 | 9/1956 | Carreau | 294/67.1 |
| 2,839,309 | 6/1958 | Turner | 294/68.1 X |
| 4,392,679 | 7/1983 | Barnes et al. | 294/67.1 X |

FOREIGN PATENT DOCUMENTS

| | | | |
|---|---|---|---|
| 314331 | 9/1969 | Sweden | 294/68.1 |

*Primary Examiner*—Johnny D. Cherry
*Assistant Examiner*—Joseph D. Pape
*Attorney, Agent, or Firm*—Lynn E. Cargill

[57] ABSTRACT

A hoisting cage for hoisting concrete forms and building materials in the general shape of a polygonal box with a top and a bottom, capable of holding concrete forms and building materials and having vertical bars at the edges of the cage and a plurality of horizontal bars attached to the vertical bars, at least two inverted V-shaped trusses positioned such that the apex of each truss is below the top of the cage, and a rotatable catch or hoisting bar for receiving the grasp of a lifting apparatus is disclosed. The hoisting cage is capable of being hoisted by the lifting apparatus because the mechanical stresses due to lifting the weight of the hoisting cage and its contents are transmitted through the trusses and distributed substantially to the vertical bars of the cage. The pivoting catch is capable of lying flat on top of the hoisting cage thereby reducing the overall height of the hositing cage in order to facilitate its transportation under low bridges.

5 Claims, 2 Drawing Sheets

FIG 1
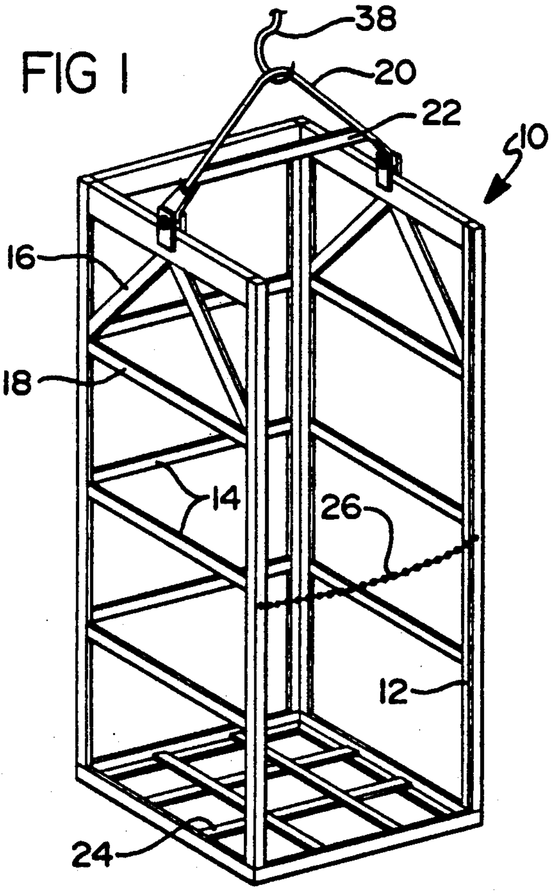
FIG 2
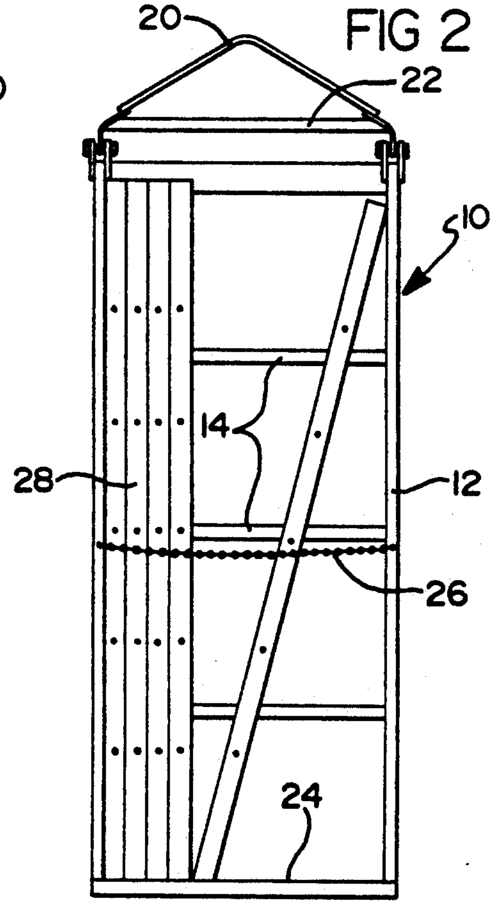
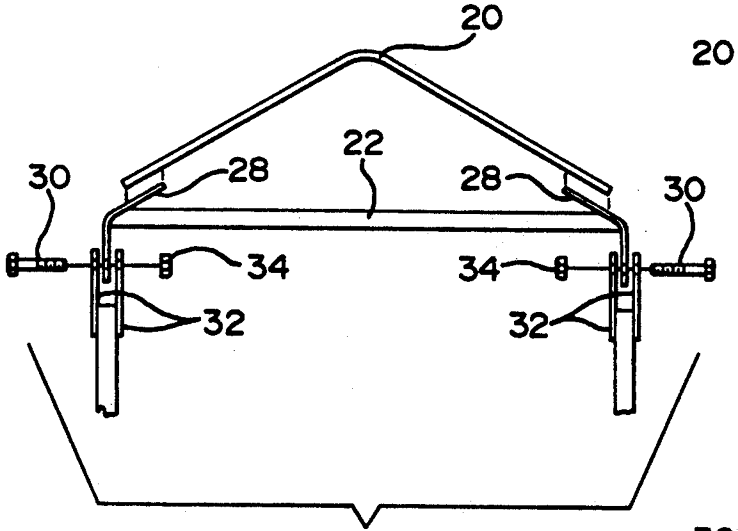
FIG 4
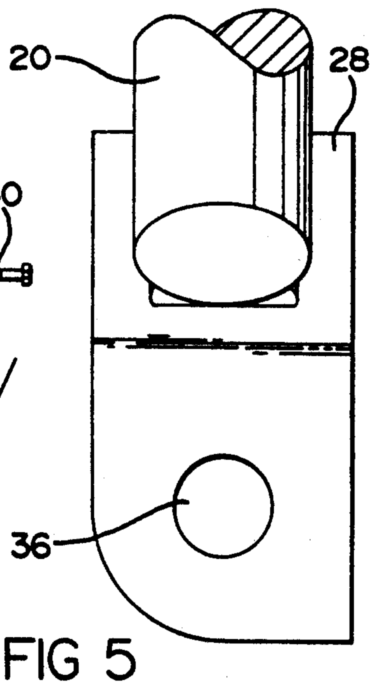
FIG 5

HOISTING CAGE WITH INTERIOR TRUSS DESIGN

TECHNICAL FIELD

This invention relates to hoisting cages for concrete forms, and more particularly relates to hoisting cages with interior trusses.

BACKGROUND OF THE INVENTION

Concrete forms are used in the process of pouring the foundations of buildings under construction. These concrete forms, typically made of aluminum, are placed into position where the foundation walls will ultimately reside. Concrete is then poured into the forms and allowed to harden, after which the forms can be removed and later re-used. These concrete forms, despite being made of aluminum, typically weigh about 100 pounds and are difficult to handle because of their weight. The handling of concrete forms, therefore, has required heavy machinery in order to load and unload the forms at the construction site as well as to transport them to and from the site.

Traditionally, cranes have been used to lift and place the concrete forms. Before lifting, the forms were loaded several at a time into hoisting cages. This practice kept the forms from falling over, as they are not suited for standing on their own, and it also saved time and effort since several forms could be moved in a single lifting operation. When a foundation needed to be installed, a crane lifted the hoisting cages loaded with concrete forms from a truck into the hole dug for the foundation. The individual forms were then manually removed from the cage and put into place. After the cement cured, and the forms were no longer needed, they were loaded back into the hoisting cages and lifted back onto a truck. The truck transported the loaded hoisting cages to and from the building sites.

Concrete forms are relatively tall, so the cages used to hoist them were made taller still in order to accommodate them. This, however, presented serious problems during transportation of the cages. The trucks transporting the hoisting cages needed to be able to travel just about anywhere to get to and from the building sites, and this meant that they would have to go under obstacles such as highway overpasses. The standard lowest clearance for highway overpasses in the United States is 13 feet 6 inches, and this was too low for ordinary trucks loaded with hoisting cages to pass under. In an attempt to overcome this problem, special measures were taken to reduce the overall height of trucks loaded with hoisting cages. One such special measure was to modify the trucks, at added expense, in order to lower the height of the beds of the trucks, hence, lowering the overall height of the trucks when loaded with hoisting cages. This situation was undesirable since the transportation of hoisting cages became dependent on these specially modified trucks.

Prior hoisting cages were made of an assembly of steel bars welded together, resulting in cages whose total height was excessive. Typically, four vertical bars formed the edges of the cage and several horizontal bars spaced along the sides of the cage were welded to the vertical bars. Exterior inverted V-shaped trusses were welded to the top of the cage such that the bottom ends of the trusses were attached to the tops of the vertical bars. The apex of the trusses pointed directly upward, towering above the rest of the hoisting cage and forming the highest point of the cage. The truss is the part of the cage that is actually caught by the hoisting crane. The trusses therefore added unwanted height to the hoisting cage. A catch was attached to the trusses and provided a place for a lifting means to grasp the cage, specifically at the apex of the catch. The catch and the trusses provided a means for distributing the stress of the lifting operation to vertical bars within the cage. This stress distribution is important and if not done properly could easily deform the cage or worse yet, cause it to fail structurally. For instance, if the cage were lifted by a horizontal bar, this bar would flex and possibly become permanently bent or even snap. Therefore, the truss is an important structural element in the hoisting cage. However, the additional height of the cage due to the truss being positioned at the top of the cage made the problem of transporting the cage much worse than it needed to be.

Therefore, it is a primary object of the present invention to provide a hoisting cage that is not significantly taller than the concrete forms it is designed to hoist and, therefore, allow the cage to be transported along standard United States highways and roads without the need for modifying the transporting trucks.

It is another object of the present invention to provide a hoisting cage with an interior truss built into the sides of the cage which can withstand the stresses due to lifting the cage and to transmit and distribute those stresses to vertical members of the cage.

It is a further object of the present invention to provide a hoisting cage with a catch for connecting the apex of the interior truss to a lifting apparatus. The catch can fold out of the way in order to reduce the overall height of the cage during transportation.

It is yet a further object of the present invention to provide a hoisting cage whose trusses can fold up in order to connect to a lifting means and also fold down to reduce the overall height of the cage during transportation.

SUMMARY OF THE INVENTION

In accordance with a preferred embodiment of the present invention, these and other objects and advantages are addressed as follows. A hoisting cage for hoisting concrete forms and building materials is disclosed which comprises a cage with a top and a bottom, capable of holding concrete forms and building materials. The cage has a frame with vertical bars at the edges and a plurality of horizontal bars attached to the vertical bars. The hoisting cage has at least two inverted V-shaped trusses, each truss having two ends and an apex in the middle. The trusses are positioned such that the apexes are attached to two of the uppermost horizontal bars of the cage at a point which is the top of the cage. The ends of the trusses are attached to vertical bars of the cage. The cage includes a catch for receiving the grasp of a lifting apparatus. The catch has two ends, adapted for attachment to first and second vertical bars of the cage at points that are substantially near the point where the apex of each truss attaches to the uppermost horizontal bars. The catch is adapted to be free to pivot about the point of attachment so that it can be folded down and out of the way. The mechanical stresses due to lifting the weight of the hoisting cage and its contents are transmitted through the V-shaped trusses and are distributed substantially to the vertical bars of the hoisting cage. The catch is capable of lying flat on top of the hoisting cage, thereby reducing the overall height of the hoisting cage in order to facilitate its transportation.

The cage may be constructed of any suitable materials, including solid bars, hollow circular tubes, hollow rectangular tubes, angle brackets or C-shaped brackets. The shape of the cage can be in the form of a polygonal box including a rectangular box.

In another embodiment of the invention, a hoisting cage for hoisting concrete forms and building materials is disclosed which comprises a cage in the general shape of a polygonal box, with a top and a bottom, again capable of holding concrete forms and building materials. The cage has a frame with vertical bars at the edges and a plurality of horizontal bars attached to the vertical bars. The cage has two inverted V-shaped rotatable trusses, each truss having two ends and an apex in the middle. The ends of the rotatable trusses are attached to the tops of vertical bars of the cage and are free to rotate about the point of attachment. In this embodiment, the trusses can fold over to rest against the side of the cage, instead of lying flat on top, when the cage is not being lifted in order to reduce the overall height of the cage for transportation. Likewise, the trusses can swing upward in order to serve as a point of attachment to a lifting apparatus. As in the other version of my cage, the mechanical stresses due to lifting the weight of the cage and its contents are transmitted through the trusses and distributed substantially to the vertical bars of the hoisting cage.

BRIEF DESCRIPTION OF THE DRAWINGS

The nature and extent of the present invention will be clear from the following detailed description of the particular embodiments thereof, taken in conjunction with the appendant drawings, in which:

FIG. 1 is a perspective view of an empty hoisting cage constructed in accordance with the present invention being hoisted by a crane;

FIG. 2 is a front view of the hoisting cage of the present invention wherein the cage is partially loaded with concrete forms;

FIG. 4 is an exploded view of the hoisting bracket for attaching a hoisting bar to a hoisting cage made in accordance with the present invention;

FIG. 5 is a detailed side view of the pivot point for a hoisting bar;

DETAILED DESCRIPTION OF THE INVENTION

Figure 3:
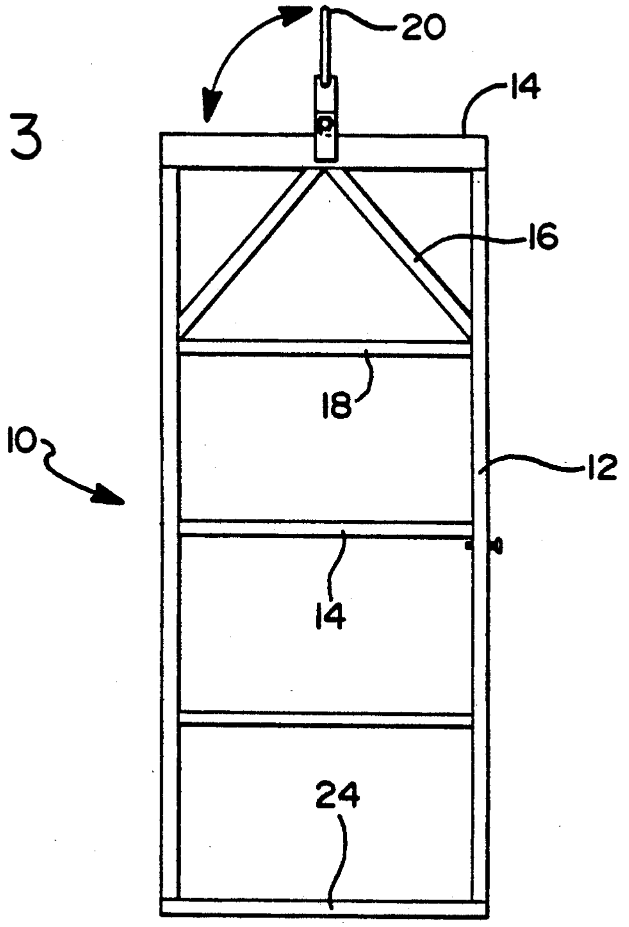
FIG. 3 is a side view of the present invention with the hoisting bar in the up position.

With combined reference to FIGS. 1, 2 and 3, a hoisting cage is generally denoted by the numeral 10. Hoisting cage 10 has a frame in the general shape of a rectangular box. The edges of hoisting cage 10 are formed by vertical bars 12 whose ends define the top and bottom of the cage. The vertical bars 12 are held in place with a plurality of horizontal bars 14 which run along the sides of hoisting cage 10. Although horizontal bars 14 need not be exactly horizontal, they should be substantially horizontal in order to minimize lateral movement of vertical bars 12 under anticipated stress loads. Inverted V-shaped trusses 16 are mounted in two opposite sides of hoisting cage 10. Each inverted V-shaped truss 16 has two ends and an apex in the middle of the truss. Each inverted V-shaped truss 16 is mounted such that the apex of the truss is attached to the uppermost horizontal bar 14 which is preferably at the top of cage 10. Alternatively, each inverted V-shaped truss 16 is mounted such that its apex is below the top of the cage. The first end of each of the inverted V-shaped trusses 16 is attached to a first vertical bar 12 and the second end of each of the inverted V-shaped trusses is attached to a second vertical bar. Each inverted V-shaped truss 16 is preferably supported immediately underneath by a horizontal bar 18, each end of which is attached substantially near the point where each end of the truss meets one of the vertical bars 12. A bottom side 24 is attached to the bottom ends of vertical bars 12 and is capable of supporting concrete forms or building materials.

As depicted in the side view of FIG. 2, the hoisting cage 10 is sized to fit standard concrete forms 28. While being hoisted, the concrete forms 28, or other building materials, may be secured by a security chain 26 in order to prevent them from falling out of the cage 10. Shelves may also be provided inside the cage to increase the amount of building materials that can be stowed and transported easily. A V-shaped hoisting bar 20, supported by stiffening bar 22 is mounted on top of cage 10 and serves as a catch for receiving a hook 38 or some other grasping mechanism from a lifting apparatus such as a crane.

Referring now to FIGS. 4 and 5, details of the attachment of hoisting bar 20 are shown in which stiffening bar 22 has two ends attached at each end to hoisting brackets 28. Each hoisting bracket 28 is in turn attached to hoisting bar 20. The subassembly comprising hoisting bracket 20, stiffening bar 22, and hoisting brackets 28, is then mounted rotatably to uppermost horizontal bar 14, near the point where the apex of V-shaped truss 16 is attached to uppermost horizontal bar 14, which is preferably at the top of cage 10. This is accomplished by bolting the assembly to uppermost horizontal bar 14 by means of bolts 30, bushings 32, and nuts 34 as depicted in FIG. 4. The bolts 30 pass through holes 36 in hoisting brackets 28 and through holes (not shown) in uppermost horizontal bar 14 thereby allowing the hoisting bar 20 to rotate about its point of attachment.

In another embodiment, (not shown) the hoisting cage may have more than four sides and be in the general shape of a polygonal box. A particularly useful cage would have six sides of equal length, being in the general shape of a hexagonal box, so that many cages could be stacked along side one another in a honeycomb fashion. In this case, there should be at least two interior trusses on opposite facing sides of the cage. This allows each end of the hoisting bar to be attached substantially near the apex of each truss and therefore to span directly across the middle of the top of the cage, thereby allowing the cage to be balanced symmetrically while it is being hoisted.

Referring again to FIGS. 1, 2 and 3, the bars of the cage, specifically the vertical bars 12, horizontal bars 14 and 18, trusses 16, hoisting bar 20, and hoisting bar stiffener 22 may be in the form of solid bars, hollow circular tubes, hollow rectangular tubes, angle brackets or C-shaped brackets. They should be made of metal, preferably steel, but can be made of other high strength metals or metal alloys such as aluminum alloy. If a particularly strong plastic is known, it may be used. The bars are preferably welded together if the material allows, but could also be riveted or fastened together with bolts or similar means.

The rotating capability of the hoisting bar 20 allows it to fold down to reduce the overall height of the hoisting cage 10 in order to facilitate its transportation. During hoisting, the hoisting bar 20 is simply rotated upwards so that it may act as a catch and be hooked onto by a grasping mechanism from a lifting device. The hoisting bar 20 also serves to transmit and distribute the stresses resulting from lifting the hoisting cage 10 to the apexes of the inverted V-shaped trusses 16.

The trusses 16 serve to properly transmit and distribute the stresses resulting from lifting the hoisting cage 10 to the vertical bars 12. The fact that the trusses 16 are internal to the cage 10, as opposed to being positioned on top of the cage as is the case in the prior art, does not affect their performance in transmitting and distributing stresses. The important advantage gained by the internal trusses 16 of the present invention is that they do not add to the overall height of the hoisting cage 10.

Figure 6:
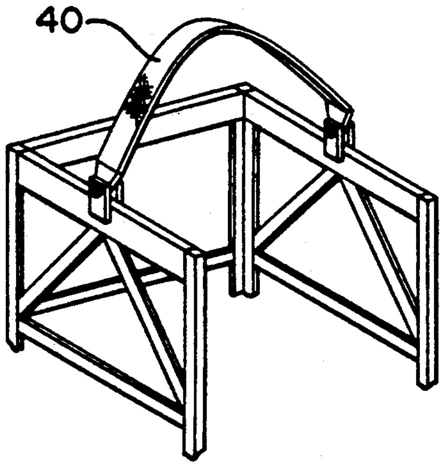
FIG. 6 is a perspective view of another embodiment of the invention where the separate hoisting bar and trusses are replaced with a pair of rotating combination truss-hoisting bars.

Looking at FIG. 6, an alternate form of a catch is depicted as a fabric strap 40 made from a material such as nylon. Such a strap could be used as part of a cage like that shown in FIG. 1 in place of hoisting bar 20. The ends of the strap can be attached substantially near the apex of trusses 16 in much the same manner as would hoisting bar 20. The ends of the strap could have the same rotatable mounting as hoisting bar 20, or the strap could simply be allowed to flex near each mounting position of its own accord, so that the strap will not add to the total height of the hoisting cage 10 during transportation.

Figure 7:
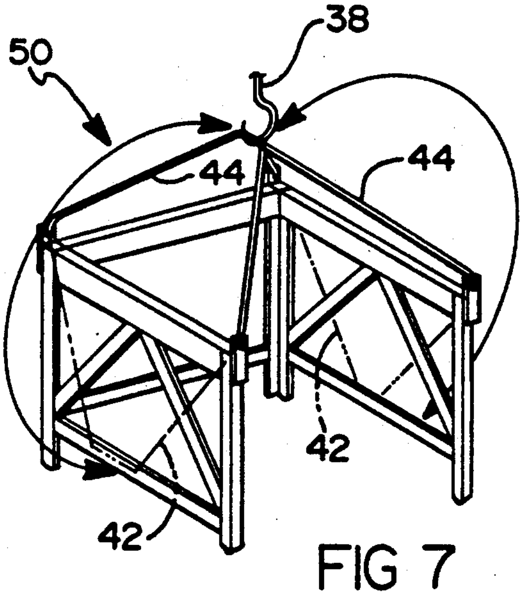
FIG. 7 is a perspective view of a nylon strap catch for hoisting the cage.

Referring next to FIG. 7, another embodiment of the hoisting cage of the present invention is generally denoted by the numeral 50. The hoisting cage 50 of FIG. 7 is generally of the same construction as the hoisting cage 10 of FIGS. 1 through 3 with the exception of the inverted V-shaped trusses 16 and hoisting bar 20. In the embodiment of FIG. 7, a pair of combination truss-hoisting bars 42 replaces the separate trusses and hoisting bars of earlier Figures. During transportation, the combination truss-hoisting bars are left in a down position. For hoisting, the bars swing up to an up position 44 so that they can receive a hook 38 or some other grasping mechanism from a lifting apparatus such as a crane. The construction and mounting of combination truss-hoisting bars 42 may be similar to that of the hoisting bar 20 and stiffening bar 22 of FIGS. 1 through 3, with the exception of the ends of the truss-hoisting bars 42 of this embodiment being mounted to the tops of the vertical bars of cage 50.

The hoisting cage 50 of FIG. 7 shares the same primary advantage as that of the cage in FIGS. 1 through 3, specifically, that there are no fixed trusses or other permanent obstructions positioned on top of the cage that add to the overall height of the cage during transportation. The combination truss-hoisting bars 42 of the hoisting cage 50 of FIG. 7 also serve to properly transmit the stresses resulting from lifting the hoisting cage and distribute them to the vertical bars 12.

Thus, there is provided in accordance with the present invention, a hoisting cage for hoisting concrete forms and building materials. The cage has internal trusses that are positioned such that the apexes of the trusses are below a point which is below the top of the cage. The internal mounting of the trusses prevents them from adding to the overall height of the cage as was the case with the prior art which had the trusses mounted atop the cage. The cage includes a catch for receiving the grasp of a lifting apparatus. The catch has at least two ends, adapted for attachment substantially near the apex of each truss. The truss or trusses are adapted to be free to rotate about their point of attachment. The mechanical stresses due to lifting the weight of the hoisting cage and its contents are transmitted through said V-shaped trusses and distributed substantially to the vertical bars of the hoisting cage. The catch is capable of lying flat on top of the hoisting cage thereby reducing the overall height of the cage during its transportation.

While my invention has been described in terms of a specific embodiment, it will be appreciated that other embodiments could readily be adapted by one skilled in the art. Accordingly, the scope of my invention is to be limited only by the following claims.

I claim:

1. A hoisting cage for hoisting concrete forms and building materials, comprising:
   (a) a cage in the general shape of a polygonal box, with a top and a bottom, said cage being capable of holding concrete forms and building materials, said cage having a frame with vertical bars at the edges of said cage and a plurality of horizontal bars attached to said vertical bars;
   (b) at least two inverted V-shaped trusses, each truss having two ends and an apex in the middle of the truss, said trusses being positioned such that the apexes of said inverted V-shaped trusses are attached to first and second horizontal bars at a point which is below the top of the cage, the first end of each of said inverted V-shaped trusses being attached to a vertical bar of said cage and the second end of each of said inverted V-shaped trusses being attached to another vertical bar of said cage; and
   (c) a catch for receiving the grasp of a lifting apparatus, said catch having two ends, the first end being rotatably attached to the first horizontal bar near the point where the apex of the first inverted V-shaped truss is attached to the first horizontal bar, the second end being rotatably attached to the second horizontal bar near the point where the apex of the second inverted V-shaped truss is attached to the second horizontal bar, such that the catch is capable of folding down to reduce the overall height of the hoisting cage in order to facilitate its transportation, whereby said hoisting cage is capable of being hoisted by a lifting apparatus secured to the catch and the mechanical stresses due to lifting the weight of the hoisting cage and its contents are transmitted through the hoisting bar to said inverted V-shaped trusses and then distributed substantially to the vertical bars of the hoisting cage.

2. The hoisting cage of claim 1, wherein the catch is an inverted V-shaped hoisting bar.

3. The hoisting cage of claim 1, wherein the cage has four sides and is in the general shape of a rectangular box.

4. The hoisting cage of claim 1, wherein the cage has six sides and is in the general shape of a hexagonal box.

5. A hoisting cage for hoisting concrete forms and building materials, comprising:
   (a) a cage in the general shape of a rectangular box, with a top and a bottom, said cage being capable of holding concrete forms and building materials, said cage having a frame with vertical bars at the edges of said cage and a plurality of horizontal bars attached to said vertical bars;

(b) at least two inverted V-shaped trusses, each truss having two ends and an apex in the middle of the truss, said trusses being positioned such that the apexes of said inverted V-shaped trusses are attached to the first and second horizontal bars at a point which is below the top of the cage, the first end of each of said inverted V-shaped trusses being attached to a vertical bar of said cage and the second end of each of said inverted V-shaped trusses being attached to another vertical bar of said cage; and (c) a hoisting bar for receiving the grasp of a lifting apparatus, said hoisting bar having two ends, the first end being rotatably attached to the first horizontal bar near the point where the apex of the first inverted V-shaped truss is attached to the first horizontal bar, the second end being rotatably attached to the second horizontal bar near the point where the apex of the second inverted V-shaped truss is attached to the second horizontal bar, such that the hoisting bar is capable of folding down to reduce the overall height of the hoisting cage in order to facilitate its transportation, whereby said hoisting cage is capable of being hoisted by a lifting apparatus secured to the hoisting bar and the mechanical stresses due to lifting the weight of the hoisting cage and its contents are transmitted through the hoisting bar to said inverted V-shaped trusses and then distributed substantially to the vertical bars of the hoisting cage.

* * * * *